US009183963B2

(12) United States Patent
Kristiansson et al.

(10) Patent No.: US 9,183,963 B2
(45) Date of Patent: Nov. 10, 2015

(54) METHOD FOR ASSEMBLING AN ELECTRON EXIT WINDOW AND AN ELECTRON EXIT WINDOW ASSEMBLY

(75) Inventors: Anders Kristiansson, Lund (SE); Krister Kristiansson, legal representative, Lund (SE); Luca Poppi, Formigine (IT); Lars-Åke Näslund, Furulund (SE); Werner Haag, Lugnorre (CH); Kurt Holm, Baden (CH); Toni Waber, Aefligen (CH)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 13/255,297

(22) PCT Filed: Jan. 27, 2010

(86) PCT No.: PCT/SE2010/000018

§ 371 (c)(1),
(2), (4) Date: Dec. 16, 2011

(87) PCT Pub. No.: WO2010/104439

PCT Pub. Date: Sep. 16, 2010

(65) Prior Publication Data

US 2012/0087842 A1 Apr. 12, 2012

Related U.S. Application Data

(60) Provisional application No. 61/160,131, filed on Mar. 13, 2009.

(30) Foreign Application Priority Data

Mar. 11, 2009 (SE) ...................................... 0900316

(51) Int. Cl.

| | |
|---|---|
| ***B01J 19/08*** | (2006.01) |
| ***G21K 5/02*** | (2006.01) |
| ***H01J 33/04*** | (2006.01) |

(52) U.S. Cl.

CPC . *G21K 5/02* (2013.01); *H01J 33/04* (2013.01); *Y10T 156/10* (2015.01)

(58) Field of Classification Search

CPC ............... H01J 33/04; H01J 5/20; H01J 5/18; H01J 33/02; H01J 33/00; G21K 5/02; G21K 5/00; G21K 5/08; Y01T 156/10; Y01T 156/1007

USPC .................................................... 422/186.07

See application file for complete search history.

(56) References Cited

U.S. PATENT DOCUMENTS

| | | | | |
|---|---|---|---|---|
| 5,391,958 | A | 2/1995 | Kelly | |
| 5,561,342 | A | 10/1996 | Roeder et al. | |
| 5,621,270 | A | 4/1997 | Allen | |
| 5,962,995 | A | 10/1999 | Avnery | |
| 2007/0010120 | A1 | 1/2007 | Flisikowski | |
| 2007/0278928 | A1 * | 12/2007 | Lee et al. | 313/420 |

FOREIGN PATENT DOCUMENTS

| | | | |
|---|---|---|---|
| JP | 2001-305281 | A | 10/2001 |
| JP | 2005-156285 | A | 6/2005 |
| JP | 2007-240454 | A | 9/2007 |

OTHER PUBLICATIONS

International Search Report (PCT/ISA/210) issued on May 21, 2010, by Japanese Patent Office as the International Searching Authority for International Application No. PCT/SE2010/000018.

* cited by examiner

*Primary Examiner* — Xiuyu Tai

(74) *Attorney, Agent, or Firm* — Buchanan Ingersoll & Rooney PC

(57) ABSTRACT

The present invention refers to a method for arranging a window foil to an electron exit window assembly of an electron beam generating device, comprises the steps of: arranging a foil support plate on a housing of the electron beam generating device, bonding a window foil to the foil support plate along a continuous bonding line, attaching a skirt of said window foil extending radially outside of the bonding line to the housing along a continuous attachment line. The invention also relates to an electron exit window assembly of an electron beam generating device.

6 Claims, 4 Drawing Sheets

METHOD FOR ASSEMBLING AN ELECTRON EXIT WINDOW AND AN ELECTRON EXIT WINDOW ASSEMBLY

THE FIELD OF THE INVENTION

The present invention refers to a method for assembling an electron exit window and an electron exit window assembly.

PRIOR ART

Electron beam generating devices may be used in sterilization of items, such as for example in sterilization of food packages or medical equipment, or they may be used in curing of e.g. ink. Generally, these devices comprise an electron exit window formed by a foil and a foil support plate. The support plate, which is preferably made of copper, has a plurality of apertures through which the electrons will exit from the electron beam generating device during operation. The foil may have a thickness of around 6-10 μm and may be made of titanium. Due to the thinness most of the electrons are able to pass through it.

The present invention primarily relates to electron beam generation devices used for irradiation of webs of material, i.e., electron beam generation devices having relatively large electron exit windows.

The method or process being used today for producing electron beam devices of the above type will be described in the following, referring to FIG. 1 and FIG. 2.

The electron beam device 100 comprises two parts; a tube body 102 housing and protecting the assembly 103 generating and shaping the electron beam, and a flange 104 carrying components relating to the output of the electron beam, such as the window foil 106 and the foil support plate 108 preventing the window foil 106 from collapsing as vacuum is established inside the device 100. Further, during operation of the electron beam device the foil is subject to excessive heat. Thereby, the foil support plate 108 also serves the important purpose of conducting heat generated in the foil 106 during use away from the foil of the device. By keeping the foil temperature moderate a sufficiently long lifetime of the foil 106 may be obtained.

In the production the support plate 108, being of copper, is bonded to the flange 104, which is separate from the tube body 102 at this stage. The flange 104 is generally made of stainless steel. The window foil 106 is then bonded onto the foil support plate 108 along a line extending along the perimeter of the foil support plate 108 (not shown, but the bonding is made at a similar point as the bonding line 210 in FIG. 3), and excess window foil 106 is trimmed off. The foil 106 may subsequently be coated, in order to improve its properties regarding for instance heat transfer. The flange 104 is subsequently attached to the tube body 102 to form a sealed housing 101.

SUMMARY OF THE INVENTION

The inventors of the present invention have discovered that this prior solution is not optimal when the electron beam device is used in for example oxygen containing atmospheres. Under these circumstances the accelerated electrons will generate ozone, which is a highly corrosive substance. The ozone may corrode the copper support, which may in turn compromise the seal of the housing and the function of the electron beam device. In addition, in a packaging machine producing food packages, hydrogen peroxide is often used to sterilize the machine parts before production of packages starts. Thus, the copper support may come into contact with hydrogen peroxide as well. Hydrogen peroxide is also highly corrosive for the copper support.

The most sensitive location is the copper volume at the bonding line with the foil 106. Here, the corrosion only needs to work underneath the bonding line, which is only a few tenths of a millimeter, in order to result in the unfortunate result described above.

The present invention aims at solving this problem by providing a method for assembling an electron exit window of an electron beam generating device, comprising the steps of arranging a foil support plate on a housing of the electron beam generating device, bonding a window foil to the foil support plate along at least one continuous bonding line, attaching a skirt of said window foil extending radially outside of the at least one bonding line to the housing along at least one continuous attachment line.

There are several advantages with the inventive method, one being that the attachment of the foil to the housing will provide a seal, which will protect the copper support plate from being subjected to corrosive substances, which may cause corrosion and failing sealability.

Preferred embodiments are defined by the dependent claims.

The invention also comprises an electron exit window assembly of an electron beam generating device comprising a foil support plate and a window foil, wherein said foil support plate is attached to a housing of the electron beam generating device, said window foil is bonded to the foil support plate along at least one continuous bonding line, and a skirt of said window foil, extending radially outside of the at least one bonding line, is attached to the housing along at least one continuous attachment line.

Preferred embodiments are defined by the dependent claims.

BRIEF DESCRIPTION OF THE DRAWINGS

In the following, presently preferred embodiments of the invention will be described in greater detail, with reference to the enclosed drawings, in which.

DESCRIPTION OF PREFERRED EMBODIMENTS

Figure 1:
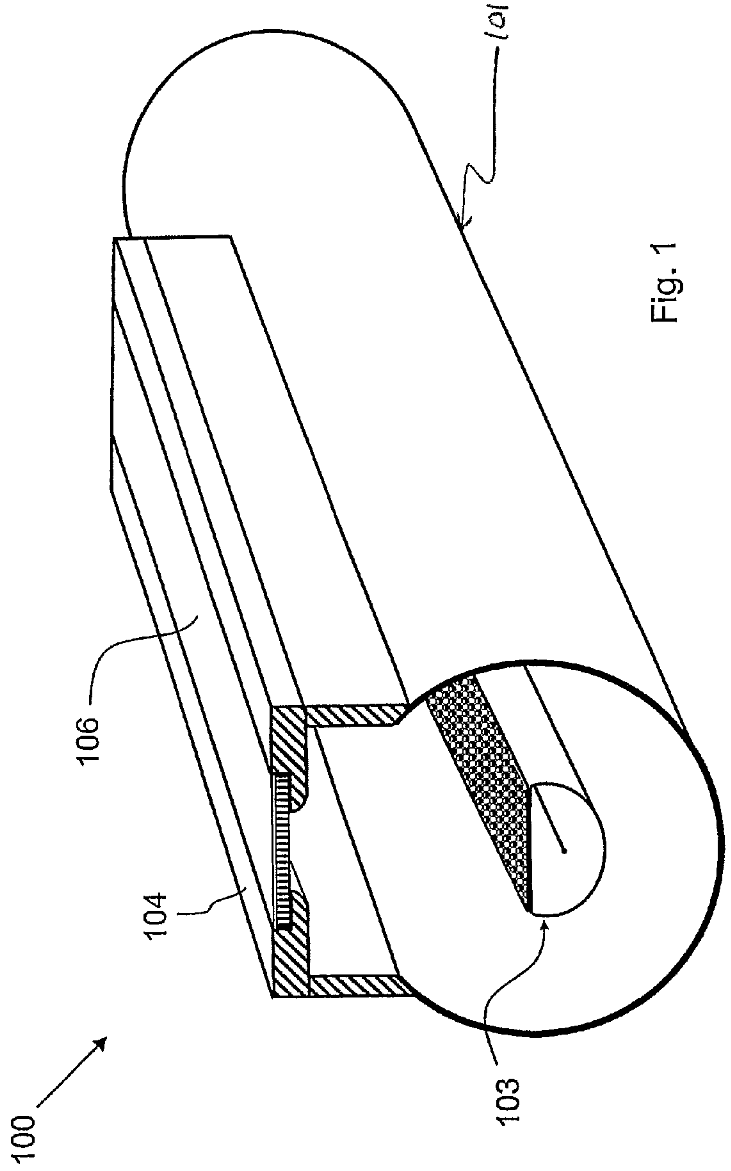
FIG. 1 is a schematic cross sectional isometric view of an electron beam device according to prior art.
Figure 2:
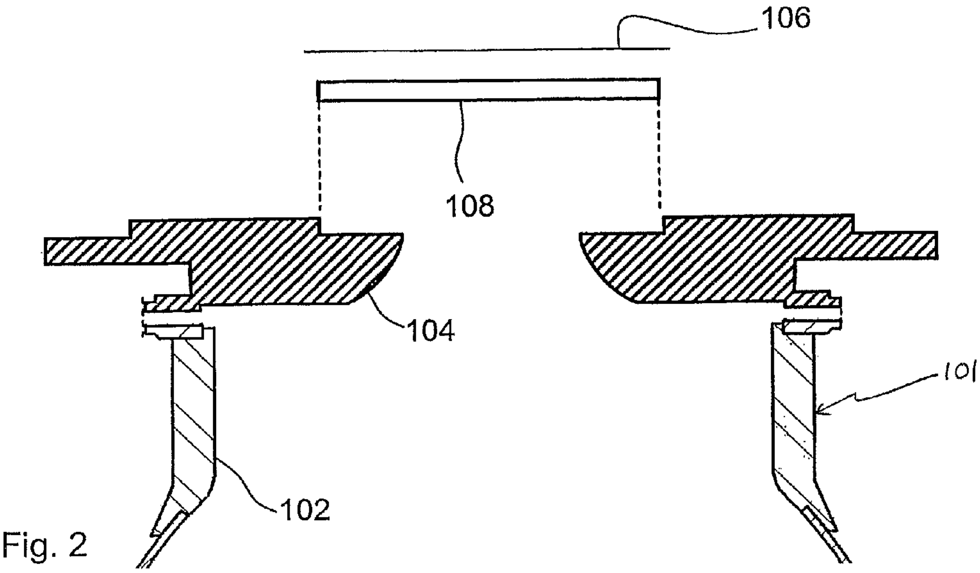
FIG. 2 is a schematic partial cross section of the device of FIG. 1, shown as an exploded view.
Figure 3:
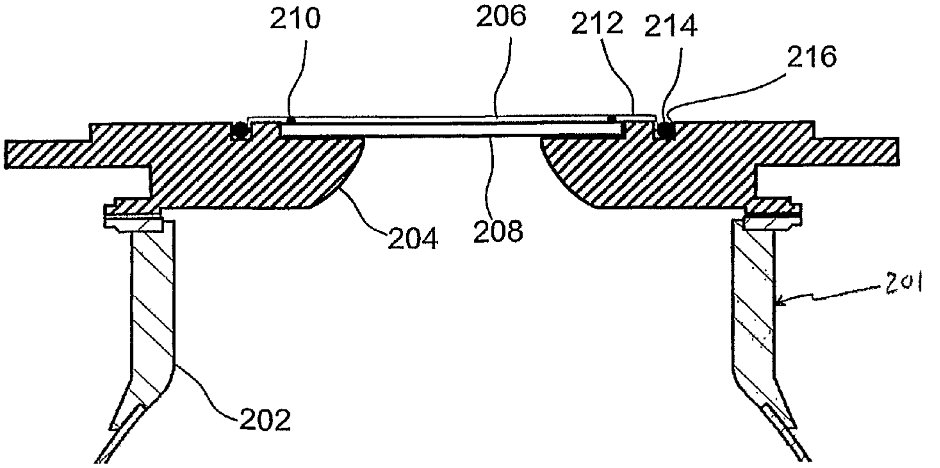
FIG. 3 is a schematic partial cross section of a device according to a first embodiment of the invention, for comparison with the cross section of FIG. 2.

FIGS. 1 and 2 have already been described. FIG. 3 is a cross section similar to FIG. 2, but not exploded, of a first embodiment of the present invention. The similarity of FIG. 2 and FIG. 3 is intentional, in order to simplify understanding of the present invention. The similarity should not, however, be construed as diminishing the inventiveness of the present invention since there is more to it than meets the eye.

The copper support 208 is bonded to the flange 204 of the housing 201 of the electron beam device. One possible bonding technique is brazing. In a separate step the window foil 206, made of titanium, is bonded onto the copper support 208. Possible bonding techniques may be for example laser welding, electron beam welding, brazing, ultrasonic welding, diffusion bonding and gluing. The bonding is made along a bonding line 210 at the circumference of the copper support 208. In this exemplary embodiment the bonding technique is diffusion bonding. The bonding line 210 is continuous to be able to maintain vacuum inside the electron beam device. The word "continuous" is used to define that the line is endless or closed. Further, it should be defined that the bonding line 210 extends along the perimeter of the support plate 208. Preferably, the bonding line 210 extends at a distance from the perimeter of the frame support plate 208. Furthermore, at least one bonding line 210 is made. Thus, two or more bonding lines may be made. For example, an inner and an outer bonding line may be made, and the two lines may, for instance, be concentric with each other.

The flange 204, the copper support 208 and the foil 206 form a window sub-assembly. The foil 206 may then optionally be coated and in the coating process only the window sub-assembly needs to be processed. After the coating process the flange 204 is bonded to the tube body 202 to form a sealed housing 201. One possible bonding technique is for example plasma welding.

Instead of trimming off the excess foil radially outside of the bonding line 210 a circumferential skirt 212 is left untouched. The free end of the skirt 212 is subsequently arranged in a groove 216 in the flange 204, where a glue 214 is applied. The glue will function as a gas and moisture seal and as such prevent harmful corrosion of the sensitive volume around the bonding line 210. The glue is preferably a high temperature resistant glue. The groove 216 is continuous and forms a continuous attachment line for the skirt 212. Further, the groove 216 is positioned at a distance from the perimeter of a hole configuration in the flange 204 over which hole configuration the support plate 208 is attached and through which hole configuration the electrons are arranged to pass.

Figure 4:
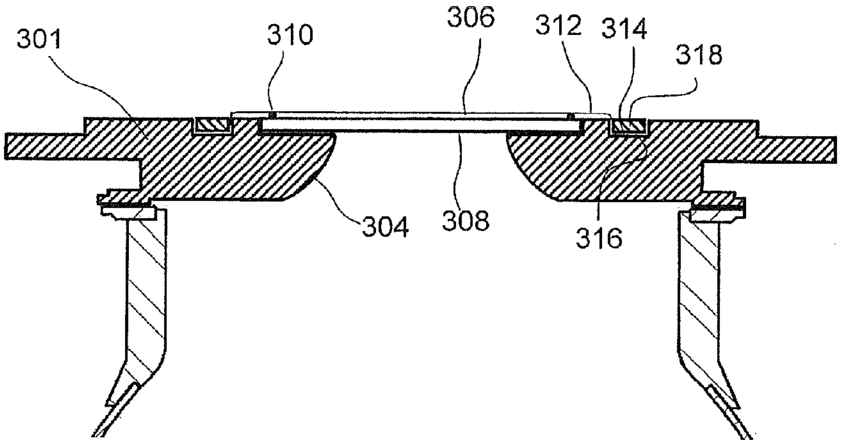
FIG. 4 is a schematic partial cross section of a device according to a first embodiment of the invention.
Figure 5:
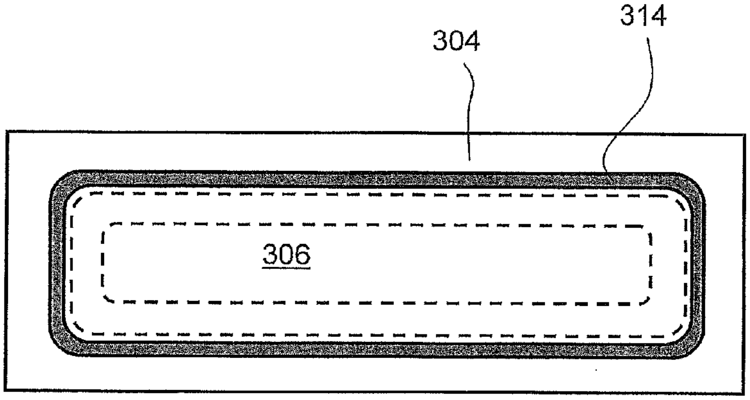
FIG. 5 is a schematic top view of the window assembly according to the second embodiment.

A second embodiment is shown in FIG. 4. The support plate 308 is attached to the flange 304 of the housing 301 of the electron beam device, and the foil 306 is bonded to the support plate 308 along a bonding line 310, in ways similar to that of the first embodiment. The difference is that the groove 316 may be large enough to receive a frame 318 on top of the foil skirt 312. Said frame 318 will facilitate tying down the skirt 312 towards the flange 304. Glue 314 is used to attach the frame 318 in the groove 316. The frame 318 is preferably continuous.

Figure 6:
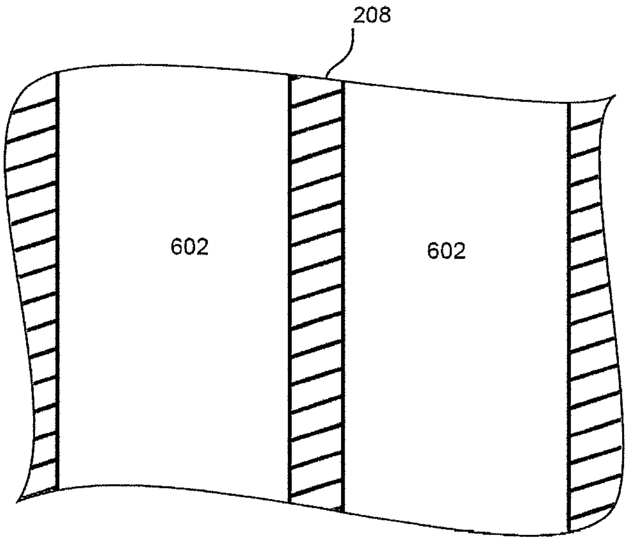
FIG. 6 is a view of a portion of a foil support plate with multiple apertures.

FIG. 6 is a view of a portion of a foil support plate 208 with multiple apertures 602.

It can be seen from FIGS. 3 and 4 that after assembly no portion of the foil support plate 208, 308 is exposed to the outside atmosphere, i.e. the atmosphere surrounding the electron beam device, and that thereby corrosion of the copper foil support plate 208, 308 is prevented.

Although the present invention has been described with respect to presently preferred embodiments, it is to be understood that various modifications and changes may be made without departing from the object and scope of the invention as defined in the appended claims.

The skirt extending radially outside of the bonding line may be attached directly to the housing without a groove. Similarly, the frame, which can be used for tying down the skirt, may be attached directly to the housing.

The invention claimed is:

1. An electron exit window assembly of an electron beam generating device comprising a foil support plate and a window foil, wherein:

said foil support plate is attached to a flange of a housing of the electron beam generating device;

said window foil is bonded to the foil support plate along at least one continuous bonding line, the bond between the window foil and the foil support plate is one of a laser weld, an electron beam weld, a braze, an ultrasonic weld, a diffusion bond, and glue; and a skirt of said window foil, extending radially outside of said at least one bonding line, is attached to the flange of the housing along at least one continuous attachment line, so that no portion of the foil support plate is exposed to the outside atmosphere, wherein said at least one attachment line is formed as a groove provided in the housing, the skirt being arranged therein.

2. The electron exit window assembly of claim 1, wherein the skirt is glued to said groove.

3. The electron exit window assembly of claim 1, wherein the skirt is tied down in said groove by a frame.

4. The electron exit window assembly of claim 3, wherein said frame is glued to the housing along the attachment line.

5. The electron exit window assembly according to claim 3, wherein said window foil is diffusion bonded to the support plate.

6. The electron exit window assembly of claim 1, wherein the foil support plate includes a plurality of apertures.

* * * * *